United States Patent
Chouraqui

(10) Patent No.: US 11,305,426 B2
(45) Date of Patent: Apr. 19, 2022

(54) ROBOT FOR MAPPING A SYNTHETIC SPORTS GROUND

(71) Applicant: MABIS, Argenteuil (FR)

(72) Inventor: Yoann Chouraqui, Argenteuil (FR)

(73) Assignee: MABIS, Argenteuil (FR)

( * ) Notice: Subject to any disclaimer, the term of this patent is extended or adjusted under 35 U.S.C. 154(b) by 247 days.

(21) Appl. No.: 16/700,323

(22) Filed: Dec. 2, 2019

(65) Prior Publication Data

US 2020/0171659 A1    Jun. 4, 2020

(30) Foreign Application Priority Data

Dec. 4, 2018   (FR) ...................... 1872288

(51) Int. Cl.
*B25J 9/16*    (2006.01)
*B25J 5/00*    (2006.01)

(52) U.S. Cl.
CPC ............. *B25J 9/1664* (2013.01); *B25J 5/007* (2013.01)

(58) Field of Classification Search
CPC ...... A01D 34/008; A01D 34/54; A01D 34/69; A01D 34/84; A01D 2101/00; A01D 34/74; A01D 34/78; B60L 50/66; B60L 53/62; G05D 1/0219; G05D 1/0225; G05D 1/0231; G05D 1/027; G05D 1/0272; G05D 1/0242; G05D 1/0246; G05D 1/0255; G05D 1/0257; G05D 1/0278; G05D 2201/0208; G05D 1/0268; B25J 5/00; B25J 5/007; B25J 9/1664

See application file for complete search history.

(56) References Cited

U.S. PATENT DOCUMENTS

| 2012/0265391 A1* | 10/2012 | Letsky | ................ | G05D 1/0088 |
| | | | | 701/25 |
| 2017/0258011 A1* | 9/2017 | Owegeser | ................ | B07B 1/30 |
| 2017/0260704 A1* | 9/2017 | De Geyter | ........... | A46B 13/001 |

FOREIGN PATENT DOCUMENTS

| WO | 2018/000922 A1 | 1/2018 | |
| WO | WO-2018000922 A1 * | 1/2018 | ............. G05D 1/027 |

OTHER PUBLICATIONS

Jul. 23, 2019 Search Report issued in French Patent Application No. 1872288.

* cited by examiner

*Primary Examiner* — Khoi H Tran
*Assistant Examiner* — Nhi Q Bui
(74) *Attorney, Agent, or Firm* — Oliff PLC; R. Brian Drozd

(57) ABSTRACT

A mapping robot that includes a frame, two motorized wheels, for each motorized wheel, a motor which drives the wheel in rotation, a location system determining a position of the robot on a synthetic ground, a control unit arranged to collect position information delivered by the location system and information on electrical consumption of each motor, and to associate the electrical consumption information with the position information, and a friction element which has teeth which rub on the synthetic ground.

3 Claims, 1 Drawing Sheet

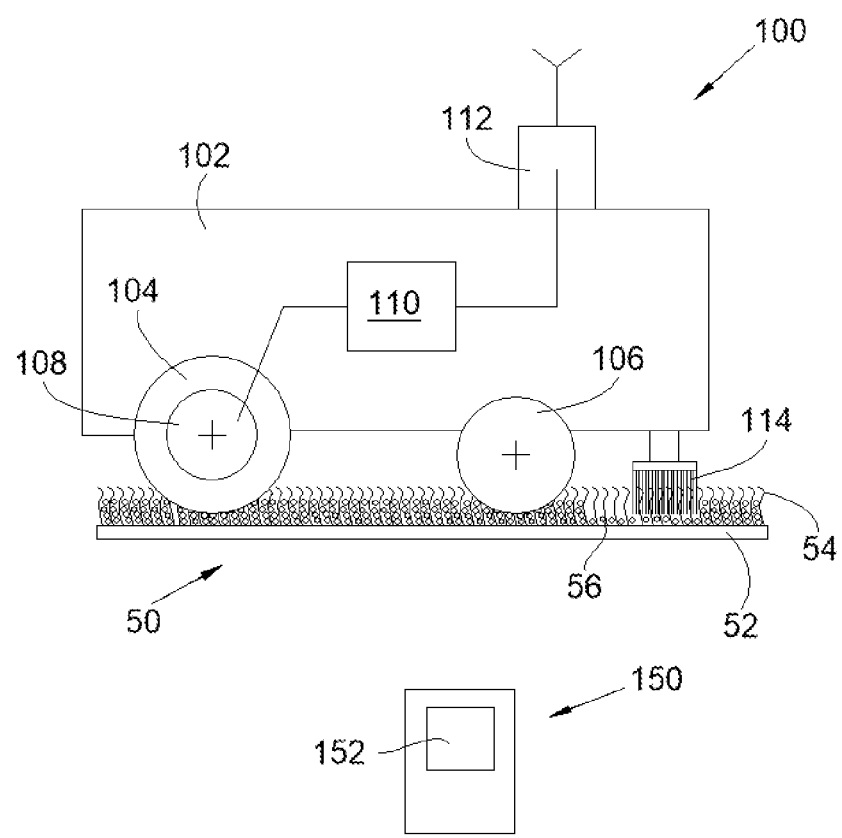

ROBOT FOR MAPPING A SYNTHETIC SPORTS GROUND

TECHNICAL FIELD

The present invention relates to a mapping robot which makes it possible to map the areas of a synthetic sports ground relative to the state of said ground, and a system comprising such a mapping robot.

STATE OF THE PRIOR ART

Currently, synthetic sports grounds are widely used. The synthetic ground is composed of a base, of synthetic strands representing strands of grass and fixed to the base, and balls, in particular of sand or of elastomer, which are poured between the synthetic strands.

Depending on how much a synthetic ground is used, the balls have a tendency to migrate from one area to the other, which ultimately gives areas that are more or less dense in terms of balls. It is then necessary to rebalance the distribution of the balls on the synthetic ground.

Currently, this rebalancing is performed empirically, which induces a significant consumption of balls as well as variable densities on the ground.

The document US-A-2017/260704 discloses a cleaning robot equipped with a localization system. The document WO-A-2018/000922 discloses a mower. The document US-A-2017/258011 discloses a cleaning robot. The document US-A-2012/265391 discloses a method to drive a robot. None of these documents allows to give information on the ground conditions where the robot moves.

SUMMARY OF THE INVENTION

One object of the present invention is to propose a mapping robot which makes it possible to map the density of balls on a synthetic ground.

To this end, a mapping robot is proposed comprising:
a frame,
at least two motorized wheels,
for each motorized wheel, a motor which drives the wheel in rotation,
a location system determining the position of the robot on a synthetic ground,
a friction element which has teeth which rub on the synthetic ground and
a control unit arranged to collect position information delivered by the location system and information on electrical consumption for each motor, and to associate to each position information, if the information on electrical consumption corresponds to an electrical consumption which is higher or lower than a threshold.

Such a robot therefore makes it possible, in the course of its movement, to evaluate the density of balls as a function of the geolocation on the synthetic ground. By reading this evaluation, it is then possible to restock only the areas which need it.

Advantageously, the friction element is adjustable heightwise.

The invention also proposes a system comprising a mapping robot according to one of the preceding variants, and a display system linked with the control unit and arranged to display, on a screen, the electric consumption information as a function of the position information.

BRIEF DESCRIPTION OF THE DRAWINGS

The features of the invention mentioned above, and others, will emerge more clearly on reading the following description of an exemplary embodiment, said description being given in relation to the attached drawing in which FIG. 1 shows a system comprising a mapping robot according to the invention.

DETAILED EXPLANATION OF EMBODIMENTS

In the following description, the terms relating to a position are taken with reference to a mapping robot in position of use on a synthetic ground, that is to say, as is represented in FIG. 1.

FIG. 1 shows a system comprising a mapping robot 100 which is disposed on a synthetic ground 50 and a display system 150.

The synthetic ground 50 comprising a base 52, synthetic strands 54 representing the strands of grass and fixed to the base 52, and balls 56, in particular of sand or of elastomer, which are poured between the synthetic strands 54.

The robot 100 comprises a frame 102 which is mounted on at least three wheels 104 and 106 forming a triangle to support the frame 102. There are at least two motorized wheels 104 disposed on either side of the frame 102 relative to a median plane of the robot 100. There is at least one additional wheel 106, which is, for example, mounted uncontrolled under the frame 102.

For each motorized wheel 104, the robot 100 comprises a motor 108 which is an electric motor which drives the wheel 104 in rotation in one direction of rotation or in the other.

The robot 100 also comprises a control unit 110 for controlling each motor 108. Depending on whether the robot 100 has to go straight or turn, the control unit 110 will power the two motors identically or differently.

The motor 100 also comprises a location system 112 which can for example be of the GPS, radio beacon, infrared system, or other such type. Generally, the location system 112 makes it possible to determine the position of the robot 100 on the synthetic ground 50 either absolutely in the case of GPS, or relatively with respect to a reference terminal in the case of an infrared system. The location system 112 is connected to the control unit 110.

The control unit 110 comprises, conventionally linked by a communication bus: a processor or CPU ("Central Processing Unit"); a random-access memory RAM; a read-only memory ROM; a storage unit such as a hard disc or a storage medium reader; at least one communication interface, allowing the control unit 110 to communicate with the motors 108 and the location system 112.

The processor is capable of executing instructions loaded in the RAM from the ROM, from an external memory (not represented), from a storage medium (such as an SD card), or from a communication network. When the robot 100 is powered up, the processor is capable of reading instructions from the RAM and of executing them. These instructions form a computer program causing the implementation, by the processor, of all or part of the algorithms and steps described hereinbelow.

All or part of the algorithms and steps described hereinbelow can be implemented in software form by the execution of a set of instructions by a programmable machine, for example a DSP ("Digital Signal Processor") or a microcontroller, or be implemented in hardware form by a machine or a dedicated component, for example an FPGA ("Field-Programmable Gate Array") or an ASIC ("Application-Specific Integrated Circuit").

The robot 100 also comprises, under the frame 102, a friction element 114 which has teeth and which can be a brush or a comb. The teeth of the friction element 114 penetrate between the synthetic strands 54 and rub on the synthetic ground 50.

Thus, when the robot 100 moves over the synthetic ground 50, the teeth rub against the synthetic strands 54 and the balls 56 and, depending on the density of the balls 56, the resistance to advance will vary, which will generate a variation in the consumption of current by the motors 108.

Thus, when the density of balls 56 increases, the consumption increases because the frictions are greater, and conversely, when the density of balls 56 decreases, the consumption decreases because the frictions are lesser.

By monitoring the motors 108, the control unit 110 knows the instantaneous consumption of each motor 108 and the position of the robot 100 through the location system 112, so it can associate a current consumption with each point of the synthetic ground 50, thus making it possible to identify the areas of the synthetic ground 50 as a function of the density of balls 56 and thus identify the areas where the densities are the lowest and where balls 56 must therefore be added.

Thus, if the current consumption of the motors 108 is above a threshold, it is not necessary to add the balls 56, and if the current consumption of the motors 108 is below the threshold, it is necessary to add the balls 56. Then the threshold corresponds to a minimal density of balls 56 to obtain.

The mapping of the synthetic ground 50 and the densities which correspond to each area are saved in the memory of the control unit 110.

The control unit 110 is thus arranged to collect position information delivered by the location system 112 and information of electrical consumption of each motor 108, and to associate the electrical consumption information with the position information. The electrical consumption information is directly representative of the density of balls 56.

In other words, the control unit 110 associates to each position information, if the electrical consumption information corresponds to an electrical consumption which is higher or lower than a threshold. Thus, when the electrical consumption is higher than a threshold, it means that the density of balls 56 is higher than the expected minimal density, and if the electrical consumption is lower than the threshold, it means that the density of balls 56 is lower than the expected minimal density.

For example, the association consists in the generation at each moment t, of a vector regrouping the coordinates X and Y, and the consumption I of each motor and which is stored in the memory of the control unit 110.

In order to be able to adapt the robot 100 as a function of the type of synthetic ground 50, the height of the friction element 114 is adjustable, manually or mechanically. In the case of a manual adjustment the friction element 114 meshes on a worm screw with vertical axis whose rotation lifts or lowers the friction element 114. In the case of a mechanical adjustment, the friction element 114 can be fixed to a vertical stem of a cylinder which can be displaced under the control of the user.

To facilitate the reading of the mapping and density information, the robot 100 is incorporated in the system also comprising the display system 150 which is, for example, a computer or a smartphone and which comprises a screen 152.

The display system 150 is linked with the control unit 110 and arranged to display, on the screen 152, the electrical consumption information as a function of the position information.

The control unit 110 can transmit the collected information to the user, for example via an application of the display system 150, and display the synthetic ground 50 on the screen 152 and show in different ways the areas that have to receive balls 56 and the areas that do not have to receive any. The user can then add balls 56 only where necessary, hence a lesser consumption of balls 56 and a better monitoring of the state of the synthetic ground 50.

The communication between the display system 150 and the control unit 110 is performed for example by wire, by cable connection between the robot 100 and the display system 150, or wirelessly, for example by wireless communication technologies, such as, for example, Wifi®, Bluetooth® etc.

The invention claimed is:

1. A system comprising a mapping robot, wherein the mapping robot comprises:
   a frame,
   at least two motorized wheels,
   for each motorized wheel, a motor configured to drive the wheel in rotation,
   a location system comprising a transmitter configured for determining a position of the robot on a synthetic ground,
   a friction element comprising teeth configured to rub on the synthetic ground, thereby causing generation of electrical consumption by the motor, the electrical consumption being representative of a density of balls at a location,
   a control unit comprising a processor arranged to collect position information delivered by the location system and information on electrical consumption of the motor, and
   a display system comprising a screen, the display system being in communication with the control unit and being arranged to display the electrical consumption as a function of position information when the electrical consumption is above or below a set threshold in order to recognize density of balls with the position information.

2. The system according to claim 1, wherein the friction element is adjustable heightwise.

3. A method comprising:
   determining, using a location system comprising a transmitter, a position of a mapping robot on a synthetic ground, the mapping robot comprising (1) at least two motorized wheels, (2) teeth, and (3) for each motorized wheel, a motor configured to drive the wheels in rotation,
   rubbing the teeth of the mapping robot on the synthetic ground, thereby causing generation of electrical consumption by the motor, the electrical consumption being representative of a density of balls at a location,
   collecting (1) position information from the location system, and (2) information on electrical consumption of the motor, and
   displaying the electrical consumption as a function of the position information when the electrical consumption is above or below a set threshold in order to recognize density of balls with the position information.

* * * * *